Feb. 14, 1950     S. G. PHILLIPS     2,497,370
STARTING GATE FOR HARNESS HORSES
Filed July 18, 1946     5 Sheets-Sheet 1
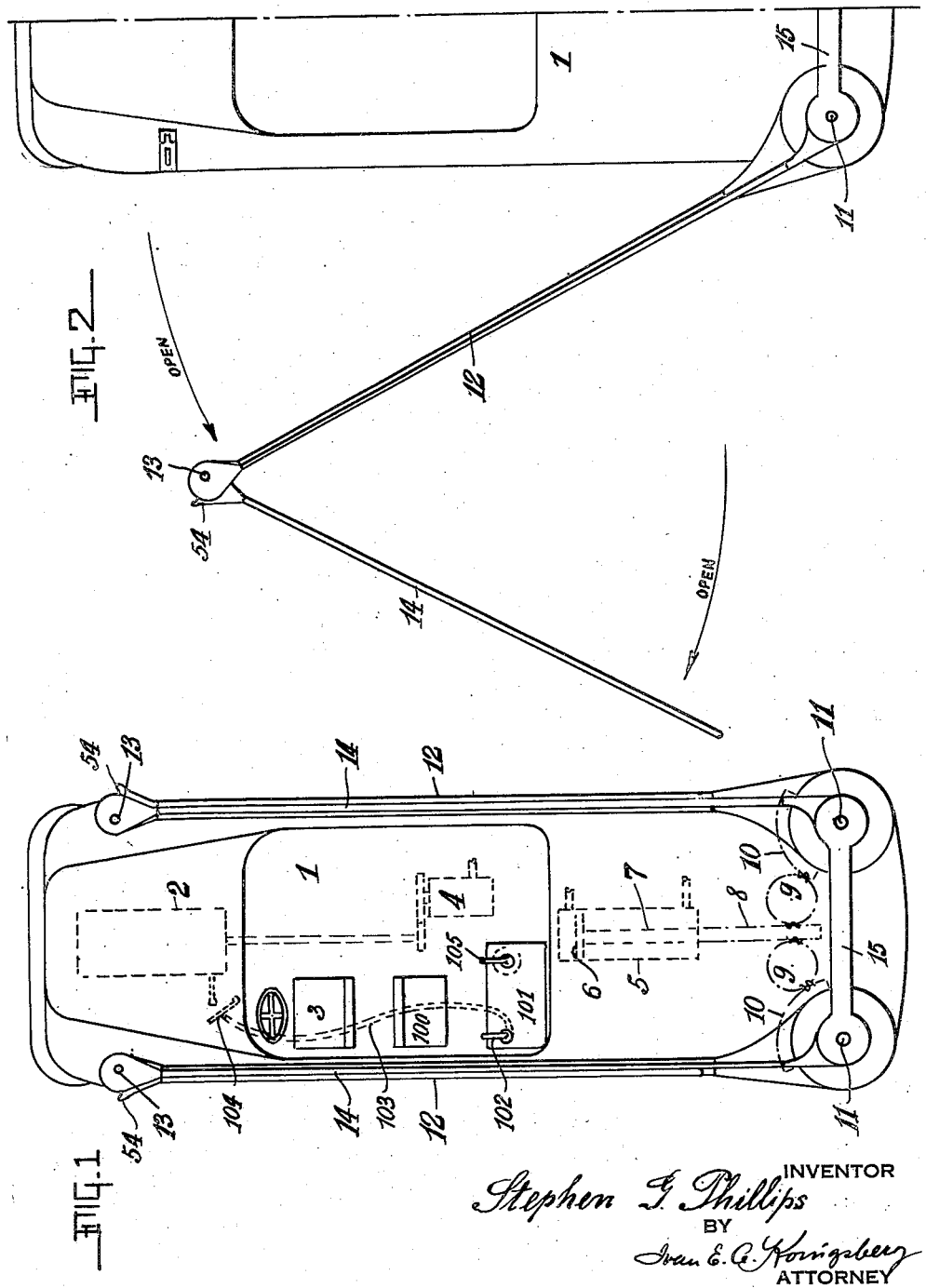
INVENTOR
Stephen G. Phillips
BY
Ivan E. G. Konigsberg
ATTORNEY

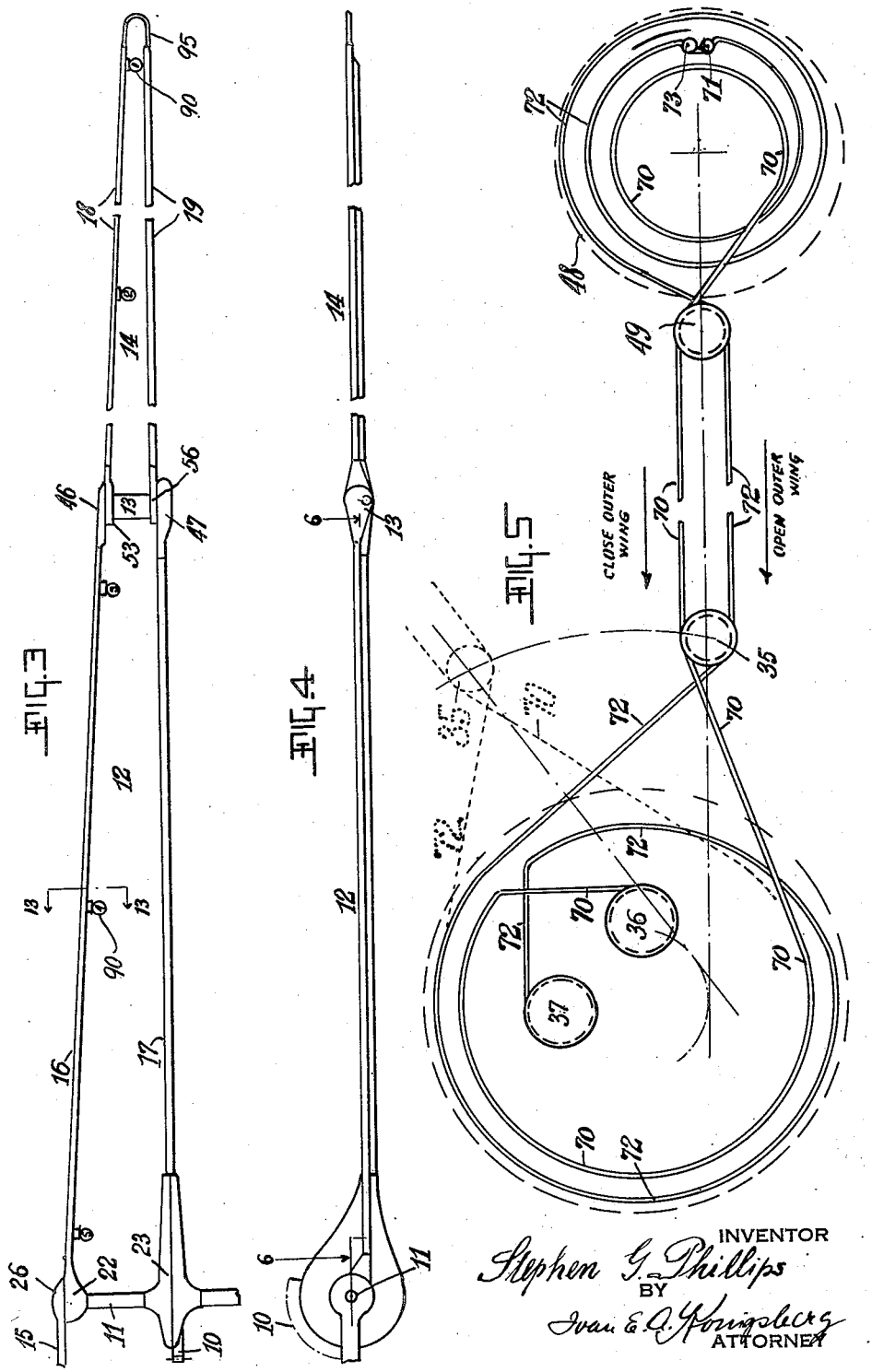

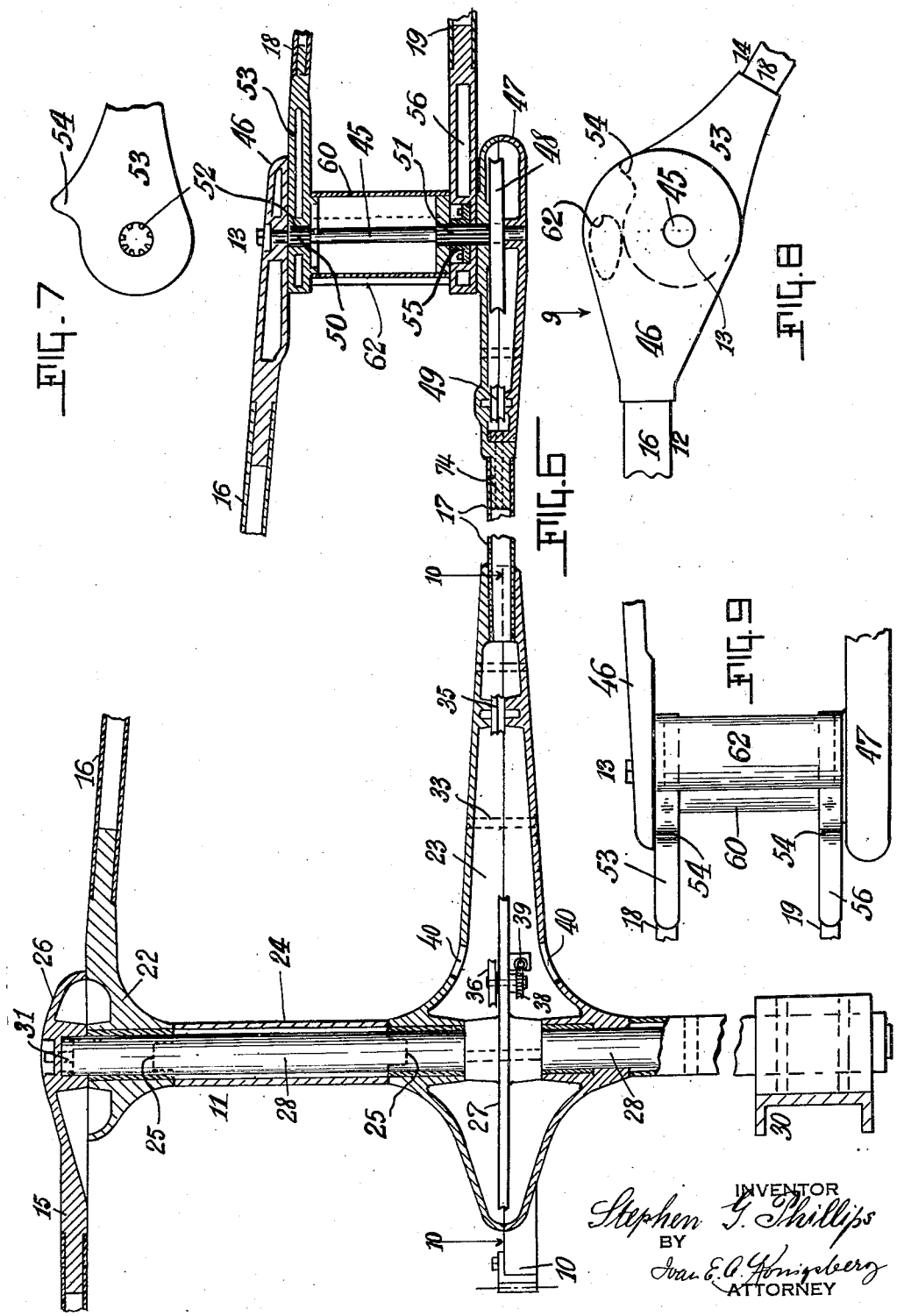

Feb. 14, 1950     S. G. PHILLIPS     2,497,370
STARTING GATE FOR HARNESS HORSES
Filed July 18, 1946     5 Sheets-Sheet 4
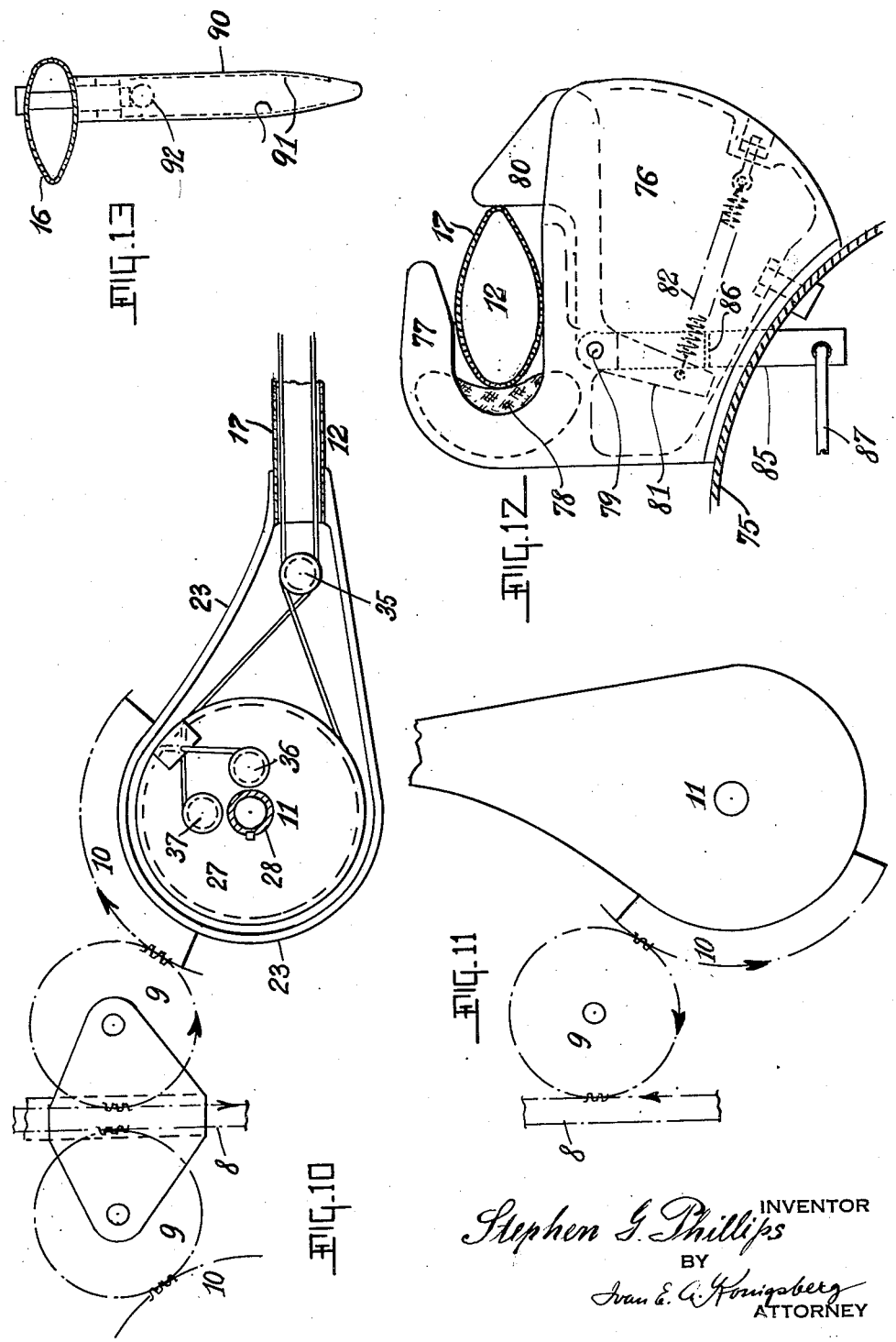

Feb. 14, 1950 S. G. PHILLIPS 2,497,370
STARTING GATE FOR HARNESS HORSES
Filed July 18, 1946 5 Sheets-Sheet 5
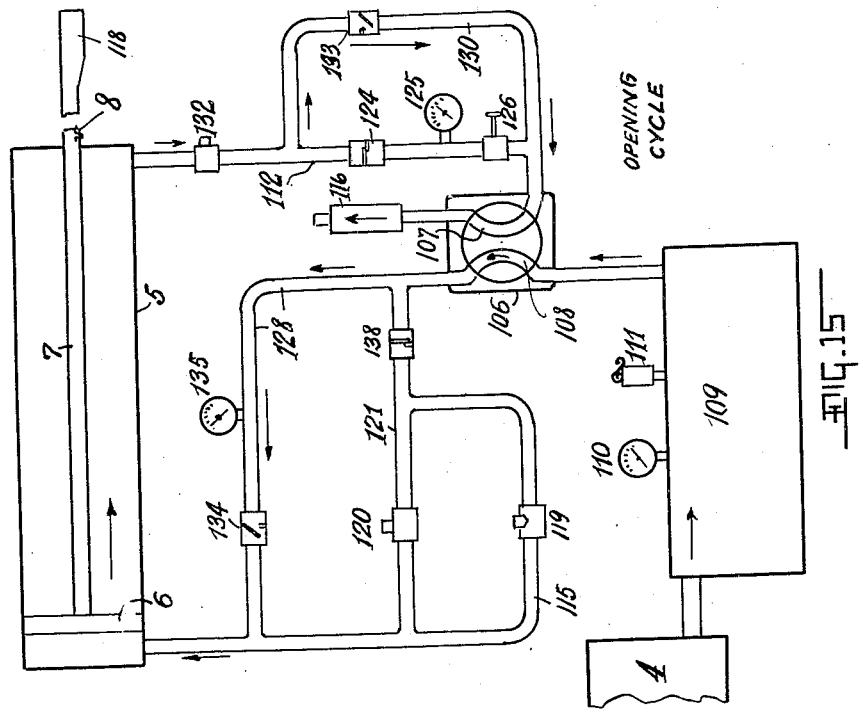
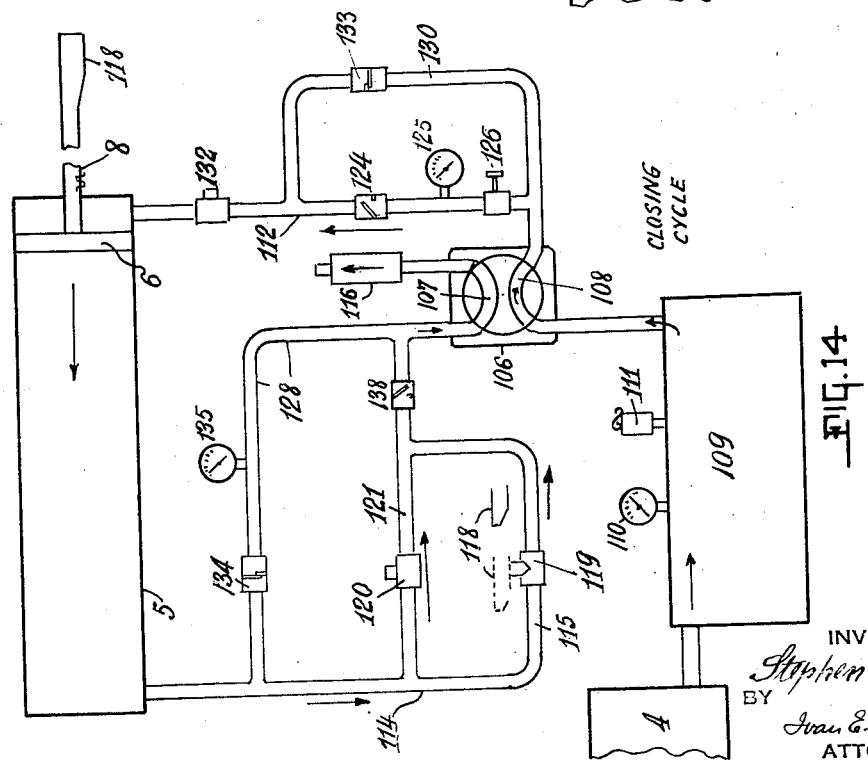
INVENTOR
Stephen G. Phillips
BY
Ivan E. C. Koringsberg
ATTORNEY Patented Feb. 14, 1950

REISSUED
DEC 19 1950
RE 23308

2,497,370

UNITED STATES PATENT OFFICE 2,497,370

STARTING GATE FOR HARNESS HORSES

Stephen G. Phillips, Westbury, N. Y.

Application July 18, 1946, Serial No. 684,584

3 Claims. (Cl. 119—15.5)

This invention relates to a starting gate for harness horses. The object of the invention is to provide a device in the form of a barrier or gate for use in lining up the horses in harness racing events so that when they reach the starting line they will be properly alined for an even start of a race.

The invention is embodied in an automobile provided with foldable gate wings. When not in use the wings are folded against the body of the automobile. When used for training, exercising or for the alining of the horses in a race the wings are swung outward from the automobile to form a straight barrier or gate at the rear of the automobile across the raceway.

The operation of the gate wings is controlled by the starter who rides in the automobile facing the rear. He also controls the speed of the automobile, the latter otherwise being driven by a chauffeur. The wings carry number plates whereby the starter may direct the movements of a particular horse by calling its number to the driver of that horse. The numbers may be illuminated for use when visibility is poor or when racing at twilight.

The starting gate according to this invention is of great importance and advantage in the sport of harness racing. It provides a convenient practical means for alining the horses before a race. It is also of advantage in training and exercising horses by compelling them to run at an even selected speed.

The invention is disclosed in a starting gate arranged and constructed as hereinafter set forth and as illustrated in the accompanying drawings in which Fig. 1 is a plan view of the automobile showing the wings folded, details being omitted.

Fig. 2 is a partial plan view of the automobile showing the gate wings partly unfolded.

Fig. 3 is a side view of one half of the gate in gate forming position with parts broken away.

Fig. 4 is a plan view of Fig. 3.

Fig. 5 is a diagram of cables which are used to operate the gate wings.

Fig. 6 is an enlarged vertical central sectional view of the gate wings, with parts broken away. The section is taken on line 6—6 of Fig. 4.

Fig. 7 is a detail view of a part shown in Fig. 6.

Fig. 8 is an enlarged detail bottom view of the outer wing hinge.

Fig. 9 is a view looking in the direction of arrow 9 in Fig. 8.

Fig. 10 is a detail view of the operating mechanism for moving the gate wings.

Fig. 11 is an outline view showing parts of Fig. 10 in folded position.

Fig. 12 is an enlarged view of a fender lock for locking the wings to the automobile when not in use as a gate.

Fig. 13 is an enlarged view of a number plate taken on the line 13—13 of Fig. 3.

Figs. 14 and 15 are power diagrams.

Referring first to Figures 1 and 2, the starting gate according to this invention includes an automobile 1 having a motor 2 and all the other usual automobile operating elements, not shown. The driver's seat is indicated at 3 behind the steering wheel. The motor drives an air compressor 4 which supplies air pressure to an air cylinder 5. In the latter moves a piston 6 with a stem 7 to which is secured a double faced rack 8 which engages two idler gears 9, 9, one on each side. Each gear 9 drives a gear quadrant 10 which operates the inner gate wing around an inner hinge 11. To the hinge 11 there is secured an inner gate wing 12 having an outer hinge 13 upon which is pivoted an outer gate wing 14. With the wings in closed position as in Figure 1, the gate wings are folded, one within the other, against the automobile. When air pressure is admitted to the air cylinder 5, the rack 8 moves out from the cylinder to unfold the gate wings at the rear of the automobile, see Figure 2, until the two wings on each side are in alinement, Figures 3 and 4. When thus alined the four gate wings, two on each side of the medial line of the automobile, form a starting gate at a right angle to the racing direction. The inner wing 12 consists of an upper and a lower tubular member 16 and 17, respectively. The outer wing consists of upper and lower tubular members 18 and 19, respectively.

The wings are moved by an operating mechanism shown in Figures 5 through 12. As shown in Figure 6 the inner wing members 16 and 17 are carried by upper and lower housing 22 and 23 respectively. The housings are connected to rotate together by a vertical hollow driving tube shaft 24 to which the housings are connected as by key lugs indicated at 25, 25 in dotted lines. The upper housing 22 fits upward against a housing 26 on a brace 15 which extends between the hinges 11 for support. The lower housing 23 is hollow and made in two parts, one upper and one lower. Within the housing 23 there is mounted a cable pulley 27 which is keyed to a vertical shaft 28. The latter extends from the chassis 30 of the automobile upwards through the drive shaft 24. The upper end of the shaft 28 is bolted at 31 to the housing 26 on the brace 15. The pulley 27 and the shaft 28 are non-rotatable and fixed, whereas the two wing housings 22 and 23 connected through the driving shaft 24 are rotatable around the shaft 28 when the quadrant 10, which is bolted to the housing 23, is operated. The entire housing 23 is rotated by the gear quadrant 10 and through the connection 24, the upper housing 22 rotates with the lower housing. The two housing halves at 23 are bolted together as indicated at 33. Within the housing 23 is also mounted a double idler pulley 35.

The large pulley 27 carries two cable tension disks 36 and 37. Each disk is separately rotatable by a worm gear 38 and worm 39. The ends of the cables which operate the outer wings are secured to the cable disks and by rotating the latter by means of the worm gear and worm the tension of the cables may be adjusted. Access to the two worms 39, only one is shown, is had through openings 40, 40 in the housing 23. The cables will be explained below.

The outer ends of the inner wing members 16 and 17 support an outer hinge pin 45, Figure 6, in housing 46 and 47, respectively. Within the lower housing 47 the hinge pin carries a pulley 48. A double idler pulley 49 is also mounted in the housing 47. The hinge pin is provided with gears 50 and 51. The upper gear 50 meshes with an inner gear 52 in the housing 53 on the inner end of the upper outer wing member 18. The housing 53 forms a stop nose 54, Figure 7. The lower gear 51 meshes with an inner gear 55 which is bolted to the housing 56 on the inner end of the lower outer wing member 19. The housing 56 also forms a stop nose 54, Figure 9, in vertical alinement with the upper nose 54. A sleeve 60 extends between the housings 53 and 56 for protection. A stop tube 62 is secured between the housings 46 and 47. It will be clear from Figures 7 to 9 that when the inner and outer wings are unfolded to form the gate, the movements of the outer wings is arrested when the noses 54 abut the tubes 62 and the wings are then alined. The construction of the wings and hinges is of course alike on both sides of the automobile, though only one side is shown.

The gate wings are operated by means of cables, see diagram in Figure 5. One cable 70 has its inner end secured to the tension disk 36. The cable then passes around the large pulley 27, over the idler pulleys 35 and 49 and then twice around the outer hinge pulley 48 where the outer end of the cable 70 is secured to the pulley at 71. Another cable 72 has its inner end secured to the other cable disk 37, passes then over the said idler pulleys and twice around the outer hinge pulley 48 where the outer end of the cable 72 is secured at 73. The cables run in opposite directions as shown.

When the double faced rack 8 is moved inwardly in the air cylinder 5, the gears 9 and quadrants 10 are actuated to swing the inner wing 12 through an angle of ninety degrees from gate position, as in Figure 10, to folded position, as in Figure 11. In Fig. 5 the cables, disks and pulleys are shown in wing-unfolded position corresponding to Fig. 10. When the wings are folded these parts are moved through an angle of ninety degrees, upwardly to the left in Fig. 5. Hence the distances between the tension disks 36, 37 on the one hand, and the pulleys 35, 49 and the cable securing points 71, 72 on the other hand, are increased as may be seen from the dotted position of pulley 35. The turns of the cables around the two disks 27 and 48, the diameters of the cable turns and the positions of the securing points at 36, 37 and 71, 73 are so calculated that as the inner wing is moved towards the automobile, the outer disk 48 is rotated one hundred eighty degrees and the outer wing folded within the inner wing.

When the air pressure moves the rack 8 outwards from the air cylinder 5, the parts are moved in the opposite directions and the wings are unfolded into gate forming position. The cables pass through the tubular wing members 17. The housings are bored to provide passage for the cables as indicated at 74 in Figure 6.

When the wings are folded as in Figure 1 they are locked to the automobile by a fender lock, Figure 12. To the fender 75 is secured a hollow housing 76 forming a fixed overhanging hook 77 which contains a rubber cushion 78. In the housing is pivoted at 79 a hook 80 having a tail 81 to which is attached a spring 82. As the inner wing swings towards the automobile the lower wing member 17 moves in over the movable hook 80 depressing the same and comes to rest against the rubber cushion 78 as shown, the hook 80 being moved up behind the member 17 by the spring 82 as will be understood to lock the wing to the automobile. The wing is released by means of a depending release lever 85 pivoted at 79. The lever has a catch 86 which engages the tail 81 to lower the hook 80 to release the wing. A pull rod 87 operates the lever.

The wings carry illuminated number plates as shown in Figure 13. Each plate comprises a housing 90 suitably attached to the wing. The housing is cut out to form the number it is to represent and the cut out portions are on the inside covered with transparent material 91. Thus the numbers face both ways and are illuminated by electric lamps 92. The wires to the lamps are not shown but are connected to the lighting system of the automobile in an obvious manner. The outer tips of the outer wings are removable as at 95 to adjust the length of the gate. As shown in Fig. 3 the ends of the wings are in the form of loops 95 which are slidably held in the tubes 18, 19 of the frame so that the loops may be moved in or out.

The operation of the starting gate is controlled by the starter who may have a seat 100 in the automobile in front of a control box 101. The starter faces the horses. For the purpose of understanding the invention it suffices to refer to the operation of the wings and the control of the speed of the automobile. The latter control is indicated diagrammatically in Figure 1. The control box has a handle 102 operatively connected, as by a flexible shaft 103 or like means, to the gas control valve 104 which regulates the supply of fuel gas to the motor 2 in the usual manner. The starter therefor by manipulating the handle 102 controls the gas supply and the speed of the automobile. When he puts the handle in neutral position the car is controlled by the chauffeur.

The control box has a two way valve operated by a handle 105. The valve is shown in Figures 14 and 15 at 106 and has two ports 107 and 108. Figure 14 shows the wing closing power cycle. With the valve in the position shown air pressure from a storage tank condenser 109 passes to the valve 106, through port 108 and pipe 112 to the air cylinder 5. The storage tank is provided with a pressure gage 110 and safety valve 111. The piston 6 is then moved inward to cause the rack 8 to close the gate wings, compare Figure 11. The exhaust pressure from the cylinder 5 passes through pipes 114 and 115 to valve port 107 and out through a muffler 116. The power rack 8 carries a cam 118 for closing a cam valve 119 in the pipe 115 near the end of the stroke. A pressure reducing valve 120 is provided in the reduced pressure pipe 121. At the end of the piston stroke the cam 118 closes the cam valve 119 and the reduced exhaust pressure leaks through the reducing valve 120. Thus an air cushion is created within the air cylinder in front of the piston to cushion the closing stroke operation. During the closing operation check valve 138 in the pipe 121 is open and check valve 124 in pipe 112 is open. The closing pressure is shown on the gage 125 and handle valve 126 is used for regulating the pressure.

Figure 15 shows the gate opening power cycle. When the valve 106 is moved to opening position, air pressure passes from the tank 109 to valve port 108 and through pipe 128 with open check valve 134 to the air cylinder. The piston then moves outward to open the gate, compare Figure 10. The exhaust pressure passes from the air cylinder through a reducing valve 132 through pipes 130 with open check valve 133 to the valve port 107 to muffler 116 and out. During the opening operation the check valves 133 and 134 are open.

In addition to the foregoing mechanisms the starting gate device may be provided with a loud speaker system, not shown. During the lining up of the horses the starter issues his directions to obtain a perfect alinement. When the starting line has been reached, the automobile drives away and the race begins. Usually the horses will begin running to the starting line a couple of hundred yards behind the same.

I claim:
1. A starting gate for harness horses comprising in combination an automobile, a pair of gate forming wing members on each side of the automobile, each pair of wing members consisting of an inner wing and an outer wing, means for pivotally supporting the inner wings on the automobile, means for hingedly connecting the outer wings to the free ends of the inner wings, and means on said wings for moving the same into a folded position on the automobile and for unfolding said wings to form a starting gate with said inner and outer wings in alinement and mechanism in the automobile for operating said wing moving means.

2. A starting gate for harness horses comprising in combination an automobile, a pair of foldable wings on each side of the automobile, each pair consisting of an inner wing pivotally supported on the automobile and an outer wing pivotally supported in the free end of the inner wing, means on said inner wing for moving the latter from a folded position alongside the automobile to an unfolded gate forming position at a right angle to the automobile and back again, mechanism in the automobile for actuating said inner wing moving means, cooperating means in each of said inner wings for automatically moving the outer wings from a folded position alongside the inner wings to a gate forming position in alinement with the inner wings when the latter are moved as aforesaid and back again, and cooperating means on said wings for alining the same in gate forming position.

3. A starting gate for harness horses comprising in combination an automobile, foldable wing members consisting of an inner wing pivotally supported on each side of the automobile at the rear end thereof and adapted to be folded into an inactive position alongside the automobile and unfolded into a starting gate forming position at right angles to the automobile, mechanism in the latter for operating said inner wings, an outer wing pivotally supported in the free end of each of said inner wings and adapted to be folded against the latter into an inactive position and unfolded therefrom into a gate forming position in alinement with the inner wings, cable power means in the inner wings automatically operable to move the outer wings as aforesaid when the inner wings are operated and means on the automobile for locking the folded wings thereto.

STEPHEN G. PHILLIPS.

REFERENCES CITED

The following references are of record in the file of this patent:

UNITED STATES PATENTS

| Number | Name | Date |
| --- | --- | --- |
| 647,166 | Stedeker | Apr. 10, 1900 |
| 673,997 | Chapman | May 14, 1901 |
| 939,703 | Jones | Nov. 9, 1909 |
| 1,822,080 | Cassidy | Sept. 8, 1931 |
| 1,876,839 | Birtwistle et al. | Sept. 13, 1932 |
| 1,916,951 | Healy | July 4, 1933 |
| 2,200,230 | Hojnowski | May 7, 1940 |
| 2,319,420 | Macksoud | May 18, 1943 |
| 2,410,543 | Kester | Nov. 5, 1946 |